3,528,473
**PROCESS OF ADHESION BETWEEN
DIFFERENT ELASTOMERS**
Luigi Torti, Stefano Marcello, and Guido Bertelli, Ferrara, Italy, assignors to Montecatini Edison S.p.A., Milan, Italy, a corporation of the Republic of Italy
Filed Jan. 25, 1966, Ser. No. 522,872
Claims priority, application Italy, Jan. 29, 1965, 1,899/65
Int. Cl. B29h 8/00; B60c 1/00; C08c 11/00
U.S. Cl. 152—330
13 Claims

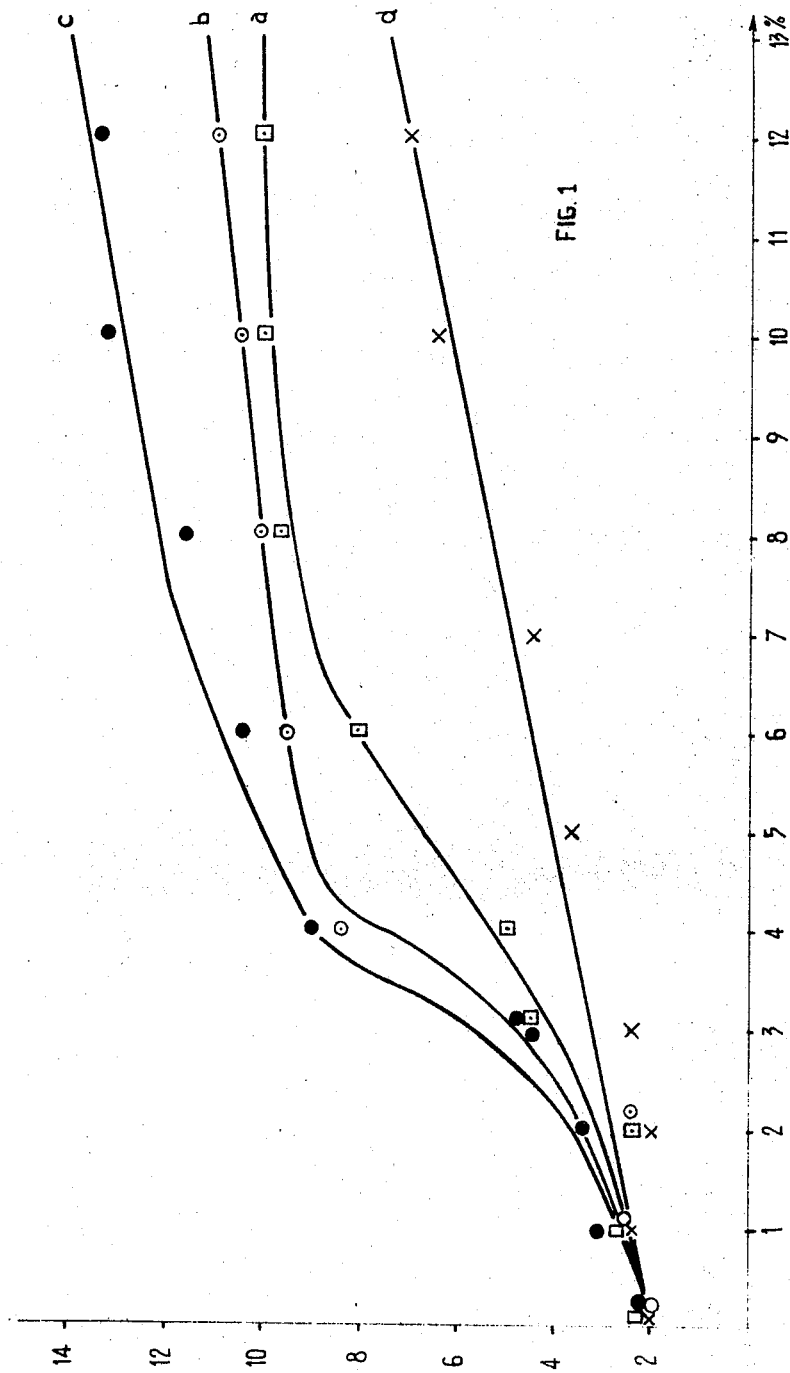

ABSTRACT OF THE DISCLOSURE

Improved adhesion between layers of relatively incompatible elastomers obtained by covulcanizing at temperatures between about 100° and 230° C., in direct contact with each other, layers of (1) ethylene propylene copolymer or polychloroprene with (2) natural rubber, SBR rubber, or polybutadiene, each layer containing a vulcanizing agent and a reinforcing filler, and layer (1) having incorporated therein an adhesion promoter which has relatively poor compatibility with such layer and which promoter is substantially more compatible with the elastomer in the next adjacent layer. Adhesion promoter is polymeric material, selected from the group consisting of polyethylene glycols having a molecular weight between about 200 and 50,000, and polymeric materials having a molecular weight between about 500 and 20,000 selected from the group consisting of natural rubber which has been depolymerized to the liquid state, liquid polybutadiene, phenol-formaldehyde and phenol-acetylenic resins, polymers of esters of resinic acid with polyhydric alcohols, silicone oils, petroleum resins of the aromatic type, cumarone-indene resins, rubbery butadiene-styrene copolymers and cobalt and zinc resinates.

---

The present invention relates to a new process for obtaining adhesion between layers of different elastomers, more particularly for causing natural rubber to adhere to synthetic dienic rubber. Further, the invention relates to a process for causing an elastomeric saturated amorphous copolymer of ethylene with an alpha-olefin such as propylene or butene-1, to adhere to natural or synthetic rubber. The invention also relates to the vulcanized articles obtained in accordance with this process.

The need often arises to cause different layers of elastomers to adhere to each other, for instance when one wishes to utilize the best elastic characteristics of one elastomer by coupling it with an outer layer of another elastomer having a better tear strength, or resistance to solvent or oxidation.

Some difficulties have often been encountered in obtaining the desired adhesion between layers of different elastomers, due either to their physical incompatibility, which prevents mutual diffusion between molecules of the different elastomers at the interface of the layers, or to chemical incompatibility between the vulcanizing systems of the respective elastomers.

Such difficulty has occurred, e.g., when attempting to obtain adhesion between elastomeric saturated amorphous copolymers of ethylene with alpha-olefins and the traditional dienic elastomers. Further, various dienic rubbers containing polar groups do not adhere readily to natural rubber or to other non-polar hydrocarbon dienic elastomers. It is, e.g., difficult to cause nitrile rubber (butadiene-acrylonitrile copolymer) and neoprene (polychloroprene) to adhere to natural rubber, polybutadiene or to other styrene-butadiene elastomers (Buna S, GRS or SBR).

Non-polar dienic elastomers, on the contrary, easily adhere to each other due to their physical and chemical compatibility. Thus, e.g., an excellent adhesion is easily obtained between layers of natural rubber, polybutadiene and GRS rubber by simply contacting the layers, each layer comprising a vulcanizable mix of the respective elastomers and containing appropriate vulcanizing agents, and heating at 150° C. for 6 minutes.

The adhesion values, measured by the ASTM method D–413/39 (Peeling) at 90° C. are, respectively:

| | Kg./cm. |
|---|---|
| natural rubber-polybutadiene | 16 |
| natural rubber-SBR | 14.5 |
| polybutadiene-SBR | 17.5 |

The value is that obtained upon breaking of one of the two adhering rubber layers, which breaking occurs before the breaking of the bond therebetween.

On the other hand, when layers of similar mixes comprising natural rubber, polybutadiene or SBR rubber are similarly contacted with layers comprising nitrile rubber or neoprene (vulcanizing agent: sulfur+N-cyclohexyl-2-benzothiazyl-sulphonamide or alpha, alpha'-bis (tert. butylperoxy)diisopropylbenzene) or ethylene-propylene copolymer (vulcanizing agent: organic peroxide+sulfur) and heated in like manner, the adhesion values are very low and completely insufficient for practical purposes, especially at temperatures higher than room temperature.

The present invention provides a process for obtaining an effective adhesion, even under heavy load conditions and at elevated temperature, between layers of different saturated or unsaturated elastomers which are usually wholly or partially incompatible and resist adhesion to each other.

The present invention further provides new vulcanized articles derived from elastomers having a different structure and which usually resist adhesion to each other.

In accordance with the present invention there is provided a process for causing adhesion, effective at elevated temperatures, between layers of different elastomers, either saturated or unsaturated, which are normally wholly or partially incompatible with each other, which process comprises covulcanizing at temperatures between about 110° and 230° C. vulcanizable layers of the respective polymers placed directly in contact with each other, each of said layers containing a vulcanizing agent and a reinforcing filler, and one of the mixes or layers containing an adhesion promoter consisting essentially of a polymeric substance having a molecular weight between about 200 and 50,000, preferably between about 500 and 20,000, the adhesion promoter being virtually physically incompatible with the layer in which it is contained but having satisfactory compatibility with the other layer in contact therewith, the adhesion promoter further being liquid or fluid at the vulcanization temperature and covulcanizable with the elastomers of the respective layers by operation of the vulcanizing agents contained therein. Although not essential, desirably the reinforcing filler is carbon black.

The process of the present invention, therefore, makes it possible to obtain adhesion of layers of unsaturated elastomers or of unsaturated elastomers and saturated olefin copolymers, which elastomers are vulcanizable with systems comprising sulfur and peroxides and which could not otherwise be made to adhere readily to each other. Typical pairings include, e.g., in the first case, natural rubber-polychloroprene, SBR rubber-polychloroprene and polybutadiene-polychloroprene; and in the second case, e.g., natural rubber-ethylene/propylene copolymer, polybutadiene-ethylene/propylene copolymer and SBR rubber-ethylene/propylene copolymer.

The adhesion promoters which may be employed in the process of the present invention may include, e.g., polyethylene glycol (preferably having a molecular weight range of from about 500 to 20,000), natural rubber which has been depolymerized to the liquid state (at room temperature), liquid polybutadiene, phenol-formaldehyde and phenol-acetylene resins, polymers of esters of resinic acid (mixtures of abietic acid and its homologues) with polyhydric alcohols, silicone oils, petroleum resins of the aromatic type, cumarone-indene resins, rubbery butadiene-styrene copolymers (e.g., 80–20) and cobalt and zinc resinates. These adhesion promoters are used in amounts between about 1 and 20 parts by weight, preferably between 5 and 15 parts by weight per 100 parts of elastomer.

The adhesion promoters of the present invention can, in some cases, interfere to some extent with the vulcanizing agents, more particularly with peroxides. Any such difficulty is readily overcome, however by using a formulation somewhat richer in peroxide. If the adhesion promoter is not readily covulcanizable by means of the vulcanizing agents comprising sulfur and accelerators normally used in vulcanizing mixes of dienic rubber, an organic peroxide and sulfur is preferably also used in these mixes.

The saturated amorphous olefin copolymers of ethylene with propylene or butene-1 have an ethylene content between about 20 and 80 mol percent, preferably between 40 and 65 mol percent, and a molecular weight between about 60,000 and 800,000, preferably between 80,000 and 500,000 and require for their vulcanization, systems comprising organic peroxides. Copolymers having a Mooney viscosity (ML(1+4) at 100° C.) of between about 15 and 150 are used in practice.

The reinforcing fillers comprise an important component of the mixes used in the present invention. It has been found particularly advantageous that each layer contain a carbon black, any one of the various commercially known types being usable. Fillers of the natural type, such as clays, kaolin, talc, silicates, anhydrous or hydrated silicas may also be used. The fillers are used in amounts of from about 5 to 200 parts by weight, preferably from 20 to 100 parts, per 100 parts of elastomer.

The vulcanization is normally carried out by heating the layers of mixes, kept in contact under pressure, at temperatures between about 110° and 230° C., preferably between 140° and 180° C.

The present invention is particularly useful for the production of manufactured articles which require a particular resistance to mechanical and dynamic stresses, such as, e.g., tires, V-shaped belts and belt conveyors. As regards the case of driving belts and of belt conveyors, in which fibrous materials form the substrate, it is obvious that the elastomer is not adhered to the fibrous materials but to layers of generally different elastomers with which the fibrous materials have previously been rubberized. In this way, one can obtain manufactured articles having surfaces of elastomeric materials which have particular requisites of resistance to abrasion, to the action of chemical agents, to ageing, etc., as often required in many common applications.

The adhesion measurements reported in the following examples were carried out according to ASTM D-413/39 Machine Method, peeling, and the values are expressed in kg./cm.

The preparation of the specimen for the determination of the adhesion values was carried out as follows: the mixes which were to adhere to each other were separately laminated in a calender into laminae having a thickness of 3 mm. from which laminae rectangles of 16 x 8 cm. were cut and, after treatment of the surfaces with a solvent such as benzene or heptane, the rectangles of the different mixes were overlapped and made to adhere to each other by vulcanizing in a press. In order to allow a traction without inconveniences of stretching, the sheets were previously reinforced with a fabric of any type, preferably rayon, on the outer surfaces.

From each of the vulcanized laminae, three specimens, 2 cm. wide, 14.5 cm. long and 0.8 cm. thick, were obtained by means of a suitable punching device, on which specimens the adhesion tests were carried out.

The measurements of tensile strength, elongation at break and elastic modulus reported in the examples were carried out according to ASTM method D-412/39, and the permanent set under tension was measured after subjecting the specimen to tension at 200% elongation for 1 hour and then allowing one minute of rest.

The tear strength, measured in kg./cm.$^2$, was carried out on specimens of 90 x 90 x 2 mm. with a transverse central cut of 5 mm.

The following examples serve to better illustrate various aspects of the present invention and are not intended to be limitative in nature.

In the following examples, all parts are by weight unless otherwise indicated.

EXAMPLE 1

Two mixes A and B, comprising respectively (A) ethylene-propylene copolymer, containing polyethylene glycol as the adhesion promoter, and (B) natural rubber and having the following specific compositions were prepared in separate mixers:

Mix A

| | Parts by weight |
|---|---|
| Ethylene-propylene copolymer (55 mol percent of propylene); ML(1+4)100° C.=35 | 100 |
| HAF carbon black | 50 |
| Zinc oxide | 5 |
| Adhesion promoter (polyethylene glycol) | 10 |
| Sulfur | 0.4 |
| Alpha, alpha'-bis(tert.butylperoxy) diisopropylbenzene [1] | 2.1 |

[1] In this and in the following examples, this peroxide is a mixture of 65% metaisomer and 35% paraisomer.

Mix B

| | Parts by weight |
|---|---|
| Natural rubber (smoked sheet) ML (1+4) 100° C.=40 | 100 |
| HAF carbon black | 50 |
| Zinc oxide | 5 |
| 2,2'-methylene-bis(4-methyl-6-tert.butylphenol) (antioxidant) | 1 |
| Alpha,alpha'-bis(tert.butylperoxy)diisopropylbenzene | 1 |

Specimens were prepared from the mixes in the manner described above, then the specimens placed in contact and caused to adhere by covulcanizing at 165° C. for 40 minutes.

In the following Table 1 are reported the mechanical characteristics of the vulcanizates of olefin copolymer including a control without adhesion promoters) and the adhesion values, expressed in kg./cm. and measured at various temperatures, between layers of the two elastomers, using polyethylene glycols of different molecular weights as adhesion promoters.

TABLE 1

| Mechanical characteristics | Mix of ethylene propylene copolymer without adhesion promoter | Mix of ethylene-propylene copolymer with polyethylene glycol — Molecular Weight Equals | | | | |
|---|---|---|---|---|---|---|
| | | 400 (Carbowax 400)[1] | 550 (Polywachs 550)[2] | 4,000 (Polywachs 4000)[2] | 6,000 (Polywachs 6000)[2] | 20,000 (Carbowax 20M)[1] |
| Tensile strength, kg. cm.[2] | 165 | 156 | 156 | 145 | 144 | 131 |
| Elongation at break, percent | 420 | 465 | 405 | 450 | 455 | 475 |
| Modulus of elasticity at 300%, kg. cm.[2] | 106 | 87 | 108 | 87 | 84 | 77 |
| Permanent set (at 200%, percent | 9.5 | 11 | 11 | 10.5 | 12.5 | 13.5 |
| Tear strength, kg. cm.[2] | 57 | 38 | 47 | 48 | 45 | 52 |
| Adhesion at: | | | | | | |
| 25° C., kg. cm | 6.5 | 18.5 | 18 | 20 | 21 | 19 |
| 90° C., kg. cm | 2 | 8.5+ | 8+ | 10.5+ | 11.5+ | 8.5+ |

[1] A commercial product of Union Carbide.
[2] A commercial product of Chemische Werke Huls.
+ = The value obtained is that upon breaking of one of the two adhering elastomer layers.

As can be seen from Table 1, the mechanical characteristics of the vulcanizates obtained from mixes of olefin copolymer containing polyethylene glycol were only a little lower than those of the mix of copolymer without polyethylene glycol, while the adhesion values were markedly increased when the olefin copolymer mix contained polyethylene glycol.

Tests carried out using triethylene glycol (M.W.=150) gave rather poor adhesion values.

EXAMPLE 2

Mixes comprising (A) ethylene-propylene copolymer containing liquid natural rubber (molecular weight of about 10,000) [2] as the adhesion promoter (10 parts by weight on the basis of the weight of the copolymer) and (B) natural rubber, the mixes having a composition analogous to that of Example 1, were caused to adhere to each other by co-vulcanizing at 165° C. for 40 minutes.

In the following Table 2 are reported the adhesion values between layers of the two mixes and the mechanical characteristics of the vulcanizates of olefin copolymer containing the adhesion promoter.

TABLE 2

| Mechanical characteristics | Mix of ethylene-propylene copolymer with liquid natural rubber (DPR)[1] |
|---|---|
| Tensile strength, kg./cm.[2] | 158 |
| Elongation at break, percent | 520 |
| Modulus of elasticity at 300%, kg./cm.[2] | 79 |
| Permanent set (at 200%), percent | 15 |
| Tear strength, kg./cm.[2] | 80 |
| Adhesion at: | |
| 25° C., kg./cm | 20 |
| 90° C., kg./cm | 8.5 |

[1] DPR = Commercial product of DPR Incorporated.

Tests carried out with depolymerized natural rubber with M.W. 150,000 gave rather poor adhesion values.

EXAMPLE 3

Mixes comprising (A) ethylene-propylene copolymer (containing phenol-formaldehyde resin as the adhesion promoter) and (B) natural rubber were caused to adhere to each other by covulcanizing at 165° C. for 40 minutes.

The composition of the mixes was as follows:

Mix A

| | Parts by weight |
|---|---|
| Ethylene-propylene copolymer (55 mol percent of propylene) ML (1+4) at 100° C.=35 | 100 |
| HAF carbon black | 50 |
| Zinc oxide | 5 |
| Phenol-formaldehyde resin [3] | 10 |
| Sulphur | 0.75 |
| Alpha,alpha'-bis(tert.butylperoxy)diisopropylbenzene | 4 |

[3] Amberol ST137X—M.W.=790 (commercial product of the Rohm & Haas Co.)

[2] Commercial product of DPR Incorporated (subsidiary of H. V. Horoman Co. Inc., Belleville, N.J. U.S.A).

Mix B

| | Parts by weight |
|---|---|
| Natural rubber (smoked sheet) ML (1+4) 100° C.=35 | 100 |
| HAF carbon black | 50 |
| Zinc oxide | 5 |
| 2,2'-methylene-bis(4-methyl-6-tert.butylphenol) (antioxidant) | 1 |
| Alpha,alpha'-bis(tert.butylperoxy)diisopropylbenzene | 1 |

The mechanical characteristics of the copolymer vulcanizate and the adhesion values between the layers are reported in the following Table 3.

TABLE 3

| Mechanical characteristics | Mix of ethylene-propylene copolymer with phenol-formaldehyde resin (Amberol ST 137X) |
|---|---|
| Tensile strength, kg./cm.[2] | 151 |
| Elongation at break, percent | 535 |
| Modulus of elasticity at 300%, kg./cm.[2] | 72 |
| Permanent set (at 200%), percent | 15 |
| Tear strength, kg./cm.[2] | 73 |
| Adhesion at: | |
| 15° C., kg./cm | 36 |
| 90° C., kg./cm | 15 |

EXAMPLE 4

Mixes comprising (A) ethylene-propylene copolymer containing promoters of various types and (B) natural rubber were caused to adhere by co-vulcanizing at 165° C. for 40 minutes. The composition of the mixes was as follows:

Mix A

| | Parts by weight |
|---|---|
| Ethylene-propylene copolymer (55 mol percent of propylene) ML (1+4) 100° C.=35 | 100 |
| HAF carbon black | 50 |
| Zinc oxide | 5 |
| Adhesion promoter (see Table 4) | 10 |
| Sulfur | 0.5 |
| alpha,alpha'-bis(tert.butylperoxy)diisopropylbenzene | 3 |

Mix B

| | Parts by weight |
|---|---|
| Natural rubber (smoked sheet) ML (1+4) 100° C.=40 | 100 |
| HAF carbon black | 50 |
| Zinc oxide | 5 |
| 2,2'-methylene-bis(4-methyl-6-tert.butylphenol) (antioxidant) | 1 |
| Alpha,alpha'-bis-(tert.butylperoxy)diisopropylbenzene | 1 |

In the following Table 4 are reported the mechanical characteristics of vulcanizates comprising olefin copolymer containing various types of adhesion promoters and the adhesion values between natural rubber and olefin copolymer. The various adhesion promoters named in Table 4 are further identified in an appendix following Table 4.

caused to adhere as a layer to a layer of a mix comprising natural rubber by covulcanizing at 165° C. for 40 minutes.

The mixes, each pair containing the same type of carbon black, had the following composition:

TABLE 4

MIXES OF ETHYLENE-PROPYLENE COPOLYMER WITH DIFFERENT PROMOTERS

| Mechanical characteristics | Koresin A | Pentalin A | Polypale ester 10 | Velsicol GD 5-28 resin | Zirex | Cumaronic resin 501 | Colophony | Triton X-100 |
|---|---|---|---|---|---|---|---|---|
| Tensile strength, kg./cm.² | 149 | 137 | 132 | 145 | 138 | 147 | 147 | 136 |
| Elongation at break, percent | 440 | 355 | 325 | 410 | 340 | 500 | 410 | 285 |
| Modulus of elasticity at 300%, kg./cm.² | 90 | 109 | 118 | 92 | 113 | 80 | 115 | |
| Permanent set (at 200%), percent | 15 | 9.5 | 7.5 | 8.5 | 11 | 10.5 | 20 | R.M.* |
| Tear strength, kg./cm.² | 61 | 37 | 36 | 45 | 40 | 42 | 68 | 33 |
| Adhesion at: | | | | | | | | |
| 25° C., kg./cm | *22.5 | *18 | *18.5 | *27 | *18.5 | *20.5 | 20 | *17 |
| 90° C., kg./cm | *11.5 | *7 | *8 | *12.5 | *7 | *10 | 6.5 | *5 |

MIXES OF ETHYLENE-PROPYLENE COPOLYMER WITH DIFFERENT PROMOTERS

| Mechanical characteristics | Cobalt resinate 629 | Cobalt resinate 346 | Cellobond H830 | Cellobond H831 | Cellobond H832 | Cellobond H833 | Cellobond H834 | Cellobond H835 |
|---|---|---|---|---|---|---|---|---|
| Tensile strength, kg./cm.² | 159 | 162 | 133 | 147 | 136 | 148 | 124 | 136 |
| Elongation at break, percent | 530 | 540 | 590 | 400 | 870 | 627 | 510 | 355 |
| Modulus of elasticity at 300%, kg./cm.² | 77 | 75 | 59 | 104 | 31 | 60 | 65 | 112 |
| Permanent set (at 200%, percent | 20.5 | 20 | 20 | 13 | 28 | 22 | 20 | 13 |
| Tear strength, kg./cm.² | 67 | 62 | 88 | 53 | 99 | 79 | 69 | 47 |
| Adhesion at: | | | | | | | | |
| 25° C., kg./cm | *16.5 | *17.5 | 35 | 22 | 20 | 27 | 20 | 20 |
| 90° C., kg./cm | *5 | *5.5 | 12 | 9 | 7.5 | 7 | 6 | 5.5 |

*These values and those marked with an asterisk in the following examples are the maxima obtained, the breaking of the specimen having occurred inside one of the two layers and not at the adhesion interface.

Appendix to Table 4—Adhesion promoters used

Koresin A:
  p - Tert.butyl phenol-acetylene resin; molecular weight: about 1000
  Commercial product of Antara Chemicals
Pentalin A:
  Esters of abietic acid with pentaerythitol molecular weight: 1060
  Commercial product of the Hercules Powder Co.
Polypale ester 10:
  Polymerized ester of abietic acid and glycerol
  Commercial product of the Hercules Powder Co.
Velsicol GD 5-28 resin:
  Petroleum resin—molecular weight 620
  Commercial product of the Velsicol Chemical Corp.
Zirex:
  Zinc salt of abietic acid in admixture with its isomers (resinic acid)
  Molecular weight: 1370
  Commercial product of the Newport Industries Co.
Cumaronic resin 501:
  Cumarone-indene resin molecular weight: 640
  Commercial product of British Resin Products Ltd.
Colophony:
  Mixture of abietic acid and its isomers in the form of resin
  Commercial product of Angler-Milan
Triton X-100:
  Polyoxyethylated nonylphenol molecular weight: 640
  Commercial product of Rohm & Haas
Cobalt resinates 629 and 346:
  Cobalt salts of abietic acid molecular weight: 660-645
  Commercial product of Lechner-Alessandria
Cellobond PA H830 to H835:
  Phenol formaldehyde resins
  Commercial product of British Resin Products Ltd.

EXAMPLE 5

A mix comprising ethylene-propylene copolymer, containing polyethylene glycol as the adhesion promoter, was Mix A

| | Parts by weight |
|---|---|
| Ethylene-propylene copolymer (55 mol percent of propylene) ML (1+4) 100° C.=35 | 100 |
| Carbon black of various types | 50 |
| Zinc oxide | 5 |
| Polyethylene glycol (Polywachs 4000) | 10 |
| Sulfur | 0.4 |
| Alpha,alpha'-bis-(tert.butylperoxy)diisopropylbenzene | 2.1 |

Mix B

| | Parts by weight |
|---|---|
| Natural rubber (smoked sheet) ML (1+4) 100° C.=40 | 100 |
| Carbon black of various types | 50 |
| Zinc oxide | 5 |
| 2,2'-methylene-bis(4-methyl-6-tert.butylphenol) (antioxidant) | 1 |
| Alpha,alpha'-bis(tert.butylperoxy)diisopropylbenzene | 1 |

In the following Table 5 are reported the adhesion values between layers of mixes comprising natural rubber and those comprising olefin copolymer, using different types of carbon black.

TABLE 5

| Type of Carbon Black | Structure [1] | Commercial name | Adhesion in kg./cm. 25° C. | 90° C. |
|---|---|---|---|---|
| HAF | Low | Neotex 100H | 11 | 5 |
| | Average | Statex R | [2] 16.5 | 7.75 |
| | High | Statex Rh | 21 | 10 |
| ISAF | Low | Neotex 130 | 18 | 7.5 |
| | Average | Statex 125 | 13 | 5 |
| | High | Statex 125H | 12.5 | 5 |

[1] The "structure" of carbon black is defined by capability of absorbing oil. See Kirk-Othmer Encyclopedia of Chemical Technology, 2nd Edition, 4,250.
[2] See note following Table 4.

EXAMPLE 6

Layers of mixes comprising (A) ethylene-propylene copolymer (containing polyethylene glycol as the adhesion promoter) and (B) mixes comprising natural rubber, these mixes having the same composition as set forth in Example 5 and containing carbon blacks of different types and having different particle diameters, were caused to adhere by covulcanizing at 65° C. for 40 minutes.

In the following Table 6 are reported the adhesion values between the various pairs of mixes having the different types of carbon black of different particle sizes.

In the following Table 7 are reported adhesion values between pairs of layers of mixes comprising natural rubber and layers of mixes comprising ethylene-propylene copolymer, respectively, containing different types and amounts of polyethylene glycol in the copolymer mix as the adhesion promoter.

TABLE 7

| Carbowax 20M (a)(Mix A) | | Polywachs 6000 (b)(Mix B) | | Polywachs 4000 (c)(Mix C) | | Polywachs 550 (d)(Mix D) | |
| --- | --- | --- | --- | --- | --- | --- | --- |
| Parts, weight percent based on weight of copolymer | Adhesion in kg./cm. at 90° C. | Parts, weight percent based on weight of copolymer | Adhesion in kg./cm. at 90° C. | Parts, weight percent based on weight of copolymer | Adhesion in kg./cm. at 90° C. | Parts, weight percent based on weight of copolymer | Adhesion in kg./cm. at 90° C |
| 12 | 10 | 12 | 11 | 12 | 13.4 | 12 | 7 |
| 10 | 10 | 10 | 10.5 | 10 | 13.5 | 10 | 6.5 |
| 8 | 9.5 | 8 | 10 | 8 | 11.5 | 7 | 4.5 |
| 6 | 8 | 6 | 9.5 | 6 | 10.9 | 5 | 3.5 |
| 4 | 5 | 4 | 8.3 | 4 | 9 | 3 | 2.5 |
| 3 | 4.5 | 3 | 4.6 | 3 | 4.5 | 2 | 2 |
| 2 | 2.5 | 2 | 2.5 | 2 | 3.5 | 1 | 2.5 |
| 1 | 2.5 | 1 | 2.5 | 1 | 3 | 0 | 2 |
| 0 | 2 | 0 | 2 | 0 | 2 | | |

TABLE 6

| Carbon black obtained by furnace process | | | Carbon black obtained by channel process | | |
| --- | --- | --- | --- | --- | --- |
| Carbon black type | Diameter of the particles in mμ | Adhesion in kg./cm. at 90° C. | Carbon black type | Diameter of the particles in mμ | Adhesion in kg./cm. at 90° C. |
| SRF | [1] 160 | 2.5 | EPC | 30 | [2] 8 |
| FEF | [1] 80 | 3 | MPC | 26 | [2] 7.5 |
| HAF | 45 | [2] 9 | HPC | 19 | [2] 7 |
| ISAF | 30.7 | [2] 7 | CC | 16.6 | [2] 7 |
| SAF | 24.6 | [2] 7 | CC | 8.8 | [2] 5 |

[1] As it can be seen from the corresponding adhesion values, diameter particles >50 mμ cause a lower adhesion between the layers; it is therefore preferable, although not essential, to use a particle size not higher than 50 mμ.
[2] See note following Table 4.

EXAMPLE 7

Layers of mixes comprising ethylene-propylene copolymer (containing variable amounts of the different polyethylene glycols) were caused to adhere to layers of mixes comprising natural rubber by covulcanizing at 165° C. for 40 minutes.

The mixes had the following composition:

| | A | B | C | D |
| --- | --- | --- | --- | --- |
| Ethylene-propylene copolymer (55 mol percent or propylene) ML (1+4) 100° C.=35 | 100 | 100 | 100 | 100 |
| HAF carbon black | 50 | 50 | 50 | 50 |
| Zinc oxide | 5 | 5 | 5 | 5 |
| Polymerized 2,2,4-trimethyl-1,2-dihydroquinoline(antioxidant) | 0.5 | 0.5 | 0.5 | 0.5 |
| Carbowax 20M [1] | (2) | | | |
| Polywachs 6000 [1] | | (2) | | |
| Polywachs 4000 [1] | | | (2) | |
| Polywachs 550 [1] | | | | (2) |
| Sulfur | 0.4 | 0.4 | 0.4 | 0.4 |
| Alpha,alpha'-bis(tert.butylperoxy)diisopropylbenzene | 2.1 | 2.1 | 2.1 | 2.1 |

[1] See Table 7.
[2] Variable.

Mix E

Parts by weight
Natural rubber (smoked sheet) ML (1+4) 100°
  C.=40 _____ 100
HAF carbon black _____ 50
Zinc oxide _____ 5
2,2' - methylene - bis(4-methyl-6-tert. butylphenol)
  (antioxidant) _____ 1
Alpha, alpha' - bis(tert. butylperoxy)diisopropylbenzene _____ 1

From Table 7 and from FIG. 1 which shows in a diagram the tabulated data (adhesion in kg./cm. at 90° C. as the function of the concentration of polyethylene glycols $a$, $b$, $c$ and $d$ in mixes A, B, C and D) it can be deduced that the best adhesion values, when polyethylene glycol is used as the promoter, are those obtained by using compounds of molecular weight between about 4000 and 6000, in amounts of from about 4 to 10 parts by weight per 100 parts of copolymer.

EXAMPLE 8

Layers of mixes comprising natural rubber were caused to adhere to layers of mixes comprising ethylene-propylene copolymer (containing polyethylene glycol as the adhesion promoter) by covulcanizing at 165° C. for different times.

The mixes had the following composition:

Mix A

Parts by weight
Ethylene-propylene copolymer (55 mol percent
  of propylene); ML (1+4) 100° C.=60 ____ 75 } 100
Paraffin oil V.G.C.[4]=0.800 _____ 25
HAF carbon black _____ 50
Zinc oxide _____ 5
Polymerized 2,2,4-trimethyl - 1,2 - dihydroquinoline
  (antioxidant) _____ 0.5
Pine tar _____ 0.5
Carbowax 4000 _____ 10
Sulfur _____ 0.75
Peroxides (see the following Table 8), variable.

[4] V.G.C.=Viscosity gravity constant.

Mix B

Parts by weight
Natural rubber (smoked sheet) ML (1+4) 100°
  C.=40 _____ 100
Hydrated silica Hi-Sil 233 (diameter of the particles=22 mμ) _____ 50
Zinc oxide _____ 3
2,2'-methylene-bis(4 methyl - 6 - tert. butylphenol)
  (antioxidant) _____ 1
Alpha,alpha'-bis (tert.butylperoxy) diisopropylbenzene _____ 1

In the following Table 8 are reported the adhesion values between pairs of layers of mixes comprising natural rubber and those comprising copolymer using different organic peroxides and different vulcanizing times.

TABLE 8

| Type of peroxide | Parts by weight | Vulcanizing time at 165° C. | Adhesion in kg./cm. at 90° C. |
|---|---|---|---|
| 2,2-bis(4,4-bis(tert.butyl-peroxy) cyclohexyl)propane | 6.4 | 40 minutes | [1] 11 |
| 2,2,5,5(tetra-tert.butyl-peroxy) hexane | 6.4 | do | [1] 12.5 |
| Dicumyl peroxide | 6 | do | [1] 12.5 |
| Alpha,alpha'-bis(tert.butyl-peroxy) diisopropylbenzene | 4 | do | [1] 13 |
| 2,5-dimethyl-2,5-bis(tert.butyl-peroxy)hexane | 5.6 | 70 minutes | [1] 10.5 |
| 2,5-dimethyl-2,5-bis(tert.butyl-peroxy)hexine-3 | 4 | do | [1] 11.5 |

[1] See note following Table 4.

EXAMPLE 9

Layers of mixes comprising polybutadiene were caused to adhere to layers of mixes comprising ethylene-propylene copolymer (containing polyethylene glycol as the adhesion promoter) by covulcanizing at 165° C. for 40 minutes.

The mixes had the following composition:

Mix A

| | Parts by weight |
|---|---|
| Ethylene-propylene copolymer (55 mol percent of propylene) ML (1+4) 100° C.=35 | 100 |
| HAF carbon black | 50 |
| Zinc oxide | 5 |
| Polymerized 2,2,4-trimethyl - 1,2 - dihydroquinoline (antioxidant) | 0.5 |
| Pine tar | 0.5 |
| Polywachs 4000 | 10 |
| Sulfur | 0.4 |
| Alpha,alpha' - bis - (tert.butylperoxy) diisopropylbenzene | 2.1 |

Mix B

| | Parts by weight |
|---|---|
| Polybutadiene ML (1+4) 100° C.=30 | 100 |
| HAF carbon black | 50 |
| Zinc oxide | 3 |
| Stearic acid | 1 |
| 2,6-di-tert.butylcresol (antioxidant) | 1 |
| Naphthenic oil (V.G.C.=0.996; $d$=1.028) | 5 |
| Alpha,alpha' - bis - (tert.butylperoxy) diisopropylbenzene | 1 |

The adhesion values were as follows:

Peeling kg./cm. 25° C.=18*
Peeling kg./cm. 90° C.=9.5*

*See note following Table 4.

EXAMPLE 10

Layers of mixes comprising butadiene-styrene copolymer (1500 type) were caused to adhere to layers of mixes comprising ethylene-propylene copolymer (containing polyethylene glycol as the adhesion promoter) by covulcanizing at 165° C. for 40 minutes.

The mixes had the following composition:

Mix A

| | Parts by weight |
|---|---|
| Ethylene-propylene copolymer (55 mol percent of propylene); ML (1+4) 100° C.=35 | 100 |
| HAF carbon black | 50 |
| Zinc oxide | 5 |
| Polymerized 2,2,4-trimethyl - 1,2 - dihydroquinoline (antioxidant) | 0.5 |
| Pine tar | 0.5 |
| Polywachs 4000 | 10 |
| Sulfur | 0.4 |
| Alpha,alpha' - bis(tert.butylperoxy) diisopropylene | 2.1 |

Mix B

| | Parts by weight |
|---|---|
| Butadiene-styrene copolymer (type 1500) ML (1+4) 100° C.=45 | 100 |
| HAF carbon black | 50 |
| Zinc oxide | 3 |
| Stearic acid | 1 |
| Phenyl-betanaphthylamine | 1 |
| Naphthenic oil (V.G.C.=0.885; $d$=0.948) | 3 |
| α,α' - Bis - (tert.butylperoxy)-diisopropylbenzene | 1 |

The adhesion values were as follows:

Peeling kg./cm. 25° C.=19.5*
Peeling kg./cm. 90° C.=10*

* See note following Table 4.

EXAMPLE 11

Layers of mixes comprising natural rubber were caused to adhere to layers of mixes comprising polychloroprene (containing C. OIL MDE 1 as the adhesion promoter) by covulcanizing for 40 minutes at different temperatures. (C. OIL MDE 1 (M.W.=2550) is a butadiene-styrene copolymer (80/20) produced by ESSO Research & Eng. Co.)

The mixes had the following composition:

| Component | A | B |
|---|---|---|
| Polychloroprene, ML (1+4) 100° C.=40 | 100 | 100 |
| HAF carbon black | 50 | 50 |
| Stearic acid | 1 | 1 |
| Phenyl-betanaphthylamine | 1 | 1 |
| Zinc oxide | 5 | 5 |
| C. OIL MDE 1 | 10 | 10 |
| Sulfur | 1.75 | |
| Alpha, alpha'-bis(tert.butylperoxy)-diisopropylbenzene | | 1 |
| N-cyclohexyl-2-benzothiazolsulphonamide | 1.25 | |
| Component | C | D |
| Natural rubber, ML (1+4) 100° C.=40 | 100 | 100 |
| HAF carbon black | 50 | 50 |
| Zinc oxide | 5 | 5 |
| 2,2'-methylene-bis(4-methyl-6-tert.butylphenol) (antioxidant) | 1 | 1 |
| Alpha,alpha'-bis(tert.butylperoxy)-diisopropylbenzene | | 1 |
| Sulfur | 2.5 | |
| N-cyclohexyl-2-benzothiazolsulphonamide | 1.2 | |

| | Vulcanization temperature ° C. | Peeling kg./cm. at 90° C. |
|---|---|---|
| Layers adhered: | | |
| A-C | 150 | [1] 12 |
| B-D | 165 | [1] 12 |

[1] See note following Table 4.

EXAMPLE 12

Layers of mixes comprising ethylene-propylene copolymer were caused to adhere to layers of mixes comprising polychloroprene (containing silicone oil [a] as the adhesion promoter) by covulcanization at 165° C. for 40 minutes.

The composition of the mixes is as follows:

Mix A

| | Parts by weight |
|---|---|
| Polychloroprene ML (1+4) 100° C.=40 | 100 |
| HAF carbon black | 50 |
| Zinc oxide | 5 |
| Stearic acid | 1 |
| Phenylbetanaphthylamine | 1 |
| Silicone oil | 10 |
| Alpha,alpha'-bis(tert.butylperoxy-diisopropylbenzene | 1 |

[a] Commercial product of Bayer A. G., molecular weight=620.

Mix B

| | Parts by weight |
|---|---|
| Ethylene-propylene copolymer (55 mol percent of propylene ML (1+4) 100° C.=35 | 100 |
| HAF carbon black | 50 |
| Zinc oxide | 5 |
| Sulfur | 0.4 |
| Alpha,alpha'-bis(tert.butylperoxy)-diisopropylbenzene | 2.1 |

The adhesion values were as follows:

Peeling kg./cm. 25° C.=17*
Peeling kg./cm. 90° C.=7*

* See note following Table 4.

EXAMPLE 13

Layers of mixes comprising polybutadiene were caused to adhere to layers of mixes comprising polychloroprene (containing silicone oil as the adhesion promoter by co-vulcanization at 165° C. for 40 minutes:

The mixes had the following composition:

Mix A

| | Parts by weight |
|---|---|
| Polychloroprene, ML (1+4) 100° C.=40 | 100 |
| HAF carbon black | 50 |
| Zinc oxide | 5 |
| Stearic acid | 1 |
| Phenyl-betanaphthylamine | 1 |
| Silicone oil, Bayer (see note a of Example 12) | 10 |
| α,α'-Bis(tert.butylperoxy)diisopropylbenzene | 1 |

Mix B

| | Parts by weight |
|---|---|
| Polybutadiene, ML (1+4) 100° C.=30 | 100 |
| HAF carbon black | 50 |
| Zinc oxide | 3 |
| Stearic acid | 1 |
| 2,6-di-tert.butylparacresol (antioxidant) | 1 |
| Alpha,alpha'-(tert.butylperoxy)diisopropylbenzene | 1 |

The adhesion values were as follows:

Peeling kg./cm. 25° C.=23*
Peeling kg./cm. 90° C.=11*

* See note following Table 4.

EXAMPLE 14

Some commercial tires with carcasses of natural rubber were retreaded with treads of ethylene-propylene copolymer having 55 mol percent of propylene and a Mooney viscosity ML (1+4) 100° C.=60, extended with a paraffin oil in the proportion of 75% of copolymer and 25% of oil.

The composition of the various mixes used is reported in the following Table 9.

TABLE 9

| Composition of the mixes | A | B | C |
|---|---|---|---|
| Natural rubber (smoked sheet) ML (1+4) 100° C.=40 | 100 | | |
| Ethylene-propylene copolymer ML (1+4) 100° C.=60 | | 70 | 75 |
| Paraffin oil | | 20 }100 | 25 }100 |
| Polywachs 4000 | | 10 | |
| HAF carbon black | | 50 | 50 |
| EPC carbon black | 50 | | |
| Zinc oxide | 5 | 5 | 5 |
| 2,2-methylene-bis-(4-methyl-6-tert.butylphenol) (antioxidant) | 1 | | |
| Diphenylguanidine | 0.5 | | |
| Polymerized 2,2,4-trimethyl-1,2-dihydroquinoline (antioxidant) | | 0.5 | 0.5 |
| Sulfur | | 0.5 | 0.6 |
| Alpha,alpha'-bis(tert.butylperoxy)diisopropylbenzene | 1.2 | 3 | 3.4 |

The retreading with a tread of ethylene-propylene copolymer and the adhesion of the tread to the carcass of vulcanized natural rubber was achieved by carrying out the following operations:

(1) Spreading over the rasped carcasses an adhesive consisting of a 20% heptane solution of the mix comprising natural rubber, mix "A" of Table 9.
(2) Application onto the carcass of a sheet of mix "A" having a thickness of 1 mm.
(3) Wetting of the surface of the natural rubber sheet already applied onto the carcass and of a sheet comprising copolymer mix "B" (see Table 9) with heptane.
(4) Application of the mix "B" sheet (comprising copolymer) having a thickness of 1 mm. onto the natural rubber sheet.
(5) Application of the tread (mix C of Table 9).
(6) Vulcanization of the thus assembled tires in a suitable mold at a temperature of 160° C. for 50 minutes.

These tires were tested on a test wheel-road at 60 km./h. and with a load of 600 kg., very satisfactory results being obtained.

In all cases the carcass broke but the tread never separated from the carcass.

EXAMPLE 15

Tires were manufactured with carcasses of natural rubber and treads of ethylene-propylene copolymer having 55 mol percent of propylene and a Mooney viscosity ML (1+4) 100° C.=60, extended with an oil of paraffinic type in the proportion: 75% of copolymer and 25% of oil.

The manufacture of the tires was carried out as follows:

(1) Application onto the drum of the building machine of the rayon plies rubberized with mixtures comprising natural rubber having the following composition:

| | Parts by weight |
|---|---|
| Natural rubber (smoked sheet) ML (1+4) 100° C.=40 | 100 |
| HAF carbon black | 50 |
| Zinc oxide | 1 |
| Stearic acid | 1 |
| Phenyl-betanahthylamine | 1 |
| Pine tar | 1 |
| Di-orthotolylguanidine | 6.75 |
| N-cyclohexyl-2-benzothiazolsulphonamide | 0.15 |
| Sulfur | 2.8 |

(2) Alication of a sheet of 1 mm. of thickness of mix "A" of natural rubber (see Table 9).
(3) Wetting of the surfaces of the natural rubber sheet already applied onto the carcass and of a sheet of mix "B," comprising copolymer (see Table 9), with heptane.
(4) Application of the sheet of mix "B," having a thickness of 1 mm. (see Table 9) onto the mix "A" sheet.
(5) Application of the tread of ethylene-propylene copolymer (mix "C" Table 9).
(6) The tires thus prepared were vulcanized in a suitable mold at temperatures of 160° C. for 50 minutes.

These tires, tested on the test wheel-road at 60 km./h. with a load of 600 kg., did not show any separation of the tread from the carcass.

EXAMPLE 16

Some commercial tires with carcasses of natural rubber were retreaded with treads of ethylene-propylene copolymer having a Mooney viscosity, ML (1+4) 100° C.=60, extended with paraffin oil in proportions of 75% of copolymer and 25% of oil.

The retreading was achieved by carrying out the following operations:

(1) Spreading of the rasped carcass with an adhesive consisting of a 20% heptane solution of a natural rubber mix having the following composition:

| | Parts by weight |
|---|---|
| Natural rubber (smoked sheet) ML (1+4) 100° C.=40 | 100 |
| Hydrated silica (Hi-Sil 233) | 50 |
| Zinc oxide | 5 |
| 2,2'-methylene-bis(4-methyl-6-tert. butylphenol) (antioxidant) | 1 |
| Diphenylguanidine | 0.5 |
| Alpha-alpha'-bis(tert. butylperoxy) diisopropylbenzene | 1.5 |

(2) Application onto the carcass of a 1 mm. thick sheet of the above natural rubber mix. The succeeding operations were as set forth in steps 3, 4, 5 and 6 of Example 14.

These tires were tested on a wheel testing road at 60 km./h. and with a load of 600 kg., with very satisfactory results.

In all cases the carcass broke and the tread never separated from the carcass.

EXAMPLE 17

Tires were manufactured with carcasses of natural rubber and treads of ethylene-propylene copolymer having 55 mol percent of propylene and a Mooney viscosity ML (1+4) 100° C.=60, extended with oil of paraffinic type in the proportion: 75% of copolymer and 25% of oil.

The manufacture of the tires was carried out as follows:

(1) Application onto the drum of the building machine of plies rubberized with the natural rubber mix having the composition set forth in Example 15.

(2) Application of a natural rubber sheet having the following composition:

| | Parts by weight |
|---|---|
| Natural rubber (smoked sheet) ML (1+4) 100° C.=40 | 100 |
| Hydrated silica (Hi-Sil 233) | 50 |
| Zinc oxide | 5 |
| 2,2'-methylene-bis(4-methyl-6-tert. butylphenol) (antioxidant) | 1 |
| Diphenylguanidine | 0.5 |
| Alpha-alpha'-tert. butylperoxy) diisopropylbenzene | 1.5 |

The succeeding operations were as set forth in steps 3, 4 and 5 of Example 15.

The tires thus prepared were vulcanized in a suitable mold at temperatures of 160° C. for 150 minutes.

These tires, tested on a wheel testing road at 60 km./h. with 600 kg. of load, did not show any separation of the tread from the carcass.

Having thus described our invention, what we desire to secure by Letters Patent and hereby claim is:

1. A process for effecting adhesion between (a) a layer of an elastomeric composition comprising a saturated copolymer of only ethylene and propylene, and (b) a layer of an elastomeric composition comprising a member selected from the group consisting of natural rubber, polybutadiene, and SBR rubber, said process comprising convulcanizing, at temperatures between 100° and 230° C., said layers (a) and (b) in direct contact with each other, each layer containing a vulcanizing agent and a reinforcing filler, each said saturated copoylmer layer (a) containing as an adhesion promoter a polyethylene glycol having a molecular weight between about 200 and 50,000.

2. The process of claim 1 wherein the filler in each layer comprises carbon black.

3. The process of claim 1 in which said polyethylene glycol is present in an amount of between about 1 and 20 parts by weight per 100 parts of elastomer in the layer in which it is contained.

4. The process of claim 3 in which the amount of said polyethylene glycol is between about 5 and 15 parts by weight.

5. The process of claim 1 in which the ethylene-alpha-olefin copolymers are saturated amorphous copolymers of ethylene with propylene or butene-1, said copolymers having an ethylene content between about 20 and 80 mol percent and a molecular weight between about 60,000 and 800,000.

6. The process of claim 5 in which the ethylene content of the copolymer is between about 40 and 65 mol percent.

7. The process of claim 5 in which the molecular weight of the copolymer is between about 80,000 and 500,000.

8. The process of claim 2 in which the carbon black is HAF carbon black produced by the furnace process.

9. The process of claim 1 in which said vulcanizing agents comprise organic peroxide and sulfur in the mixes of ethylene-alpha-olefin copolymers and comprise sulfur and accelerators or organic peroxide and sulfur in the mixes of unsaturated rubbers.

10. The process of claim 1 in which carbon black is present as the reinforcing filler in each mix in an amount of from about 5 to 200 parts by weight per 100 parts of elastomer.

11. The process of claim 10 in which the amount of carbon black is between about 20 and 100 parts by weight.

12. Vulcanized elastomers obtained by the process of claim 1.

13. The vulcanized articles of claim 12 in the form of new or retreaded tires.

References Cited

UNITED STATES PATENTS

| 2,933,480 | 4/1960 | Gresham | 260—80.5 |
| 3,201,374 | 8/1965 | Simms | 260—80.5 |
| 3,264,768 | 8/1966 | Sheary | 161—227 |
| 3,294,866 | 12/1966 | Soldatos | 260—845 |
| 3,330,794 | 7/1967 | Gallagher | 260—29.3 |
| 3,331,804 | 7/1967 | Fogiel | 260—33.6 |
| 3,354,107 | 11/1967 | Hamed | 260—31.2 |
| 3,364,155 | 1/1968 | Souffie | 260—4 |

JOHN T. GOOLKASIAN, Primary Examiner

C. B. COSBY, Assistant Examiner

U.S. Cl. X.R.

156—110, 308, 328, 338; 161—242, 253, 255; 260—3, 28.5, 33.4, 887, 897

PO-1050
(5/69)

UNITED STATES PATENT OFFICE
CERTIFICATE OF CORRECTION

Patent No. 3,528,473          Dated September 15, 1970

Inventor(s) LUIGI TORTI, STEFANO MARCELLO and GUIDO BERTELLI

It is certified that error appears in the above-identified patent and that said Letters Patent are hereby corrected as shown below:

Column 2, Line 14:    "elastomers" should read -- elastomer --.

Column 3, Line 53:    "natural" should read -- mineral --.

Column 4, Line 70:    "copolymer in-" should read -- copolymer (in- --.

Column 5, Table 1, Line 4, under column headed "Mechanical Characteristics":    "(at 200%, percent" should read -- (at 200%) percent --.

Column 14, Line 46:    "6.75" should read -- 0.75 --.

Column 14, Line 51:    "Alication" should read -- Application --.

Column 15, Line 47:    "-tert.butylperoxy)" should read -- -tert.(butylperoxy) --.

Column 15, Line 63:    "comprising con-" should read -- comprising co- --.

Signed and sealed this 9th day of May 1972.

(SEAL)
Attest:

EDWARD M. FLETCHER, JR.
Attesting Officer

ROBERT GOTTSCHALK
Commissioner of Patents